United States Patent [19]

Gutierrez et al.

[11] Patent Number: 4,491,524

[45] Date of Patent: Jan. 1, 1985

[54] LUBRICATING ADDITIVE FOR DRILLING MUDS

[75] Inventors: Antonio Gutierrez, Mercerville; Darrell W. Brownawell, Scotch Plains, both of N.J.; Thad O. Walker, Humble, Tex.; Stanley J. Brois, Westfield, N.J.

[73] Assignee: Exxon Research & Engineering Co., Florham Park, N.J.

[21] Appl. No.: 559,340

[22] Filed: Dec. 8, 1983

Related U.S. Application Data

[63] Continuation-in-part of Ser. No. 428,826, Sep. 30, 1982, abandoned.

[51] Int. Cl.³ .................. C09K 7/00; C09K 3/00; E21B 3/00
[52] U.S. Cl. .................. 252/8.5 C; 252/47.5; 548/237
[58] Field of Search ............. 252/8.5 A, 8.5 C, 47.5; 548/237, 238

[56] References Cited

U.S. PATENT DOCUMENTS 3,039,961  6/1962  Harker .................. 252/47.5
3,996,237  12/1976  Tomalia ................. 548/238
4,045,447  8/1977  Arlt .................... 548/238
4,064,055  12/1977  Carney ................. 252/8.5 C

FOREIGN PATENT DOCUMENTS 42358  12/1981  European Pat. Off. .......... 252/47.5
1171983  11/1969  United Kingdom .

OTHER PUBLICATIONS

Combret and Tekin, "Preparation of Dichloromethyl-2 Dimethyl-4,4-Oxazoline . . . ", Sep. 26, 1977, Series C, pp. 249-251, Comptes Rendus, Academy of Sciences.
Chemical Abstracts Service Registry No. 24448-05-3, 2-Oxazoline-4-Methanol, 2-[(Dodecyl-Thio)Methyl-]-4-Methyl- from CAold file (1967-date).

*Primary Examiner*—Herbert B. Guynn
*Assistant Examiner*—Catherine S. Kilby
*Attorney, Agent, or Firm*—Roland A. Dexter

[57] ABSTRACT

Aqueous drilling fluids containing a minor amount of an additive composition featuring oxazolines of $C_1$–$C_{30}$ alkylthioglycolic acid. Such fluids are especially useful where reduced torque drilling fluids are needed. Another embodiment of this invention relates to a method of drilling utilizing the above-described fluids.

9 Claims, No Drawings

LUBRICATING ADDITIVE FOR DRILLING MUDS

This is a continuation in part application of Ser. No. 428,826, filed Sept. 30, 1982, now abandoned.

This invention relates to aqueous drilling fluids. More particularly, this invention relates to aqueous drilling fluids having incorporated therein a minor amount of an oxazoline of alkylthioglycolic acids which are especially effective as lubricity modifiers for drilling fluids. In another embodiment this invention is directed to an improved drilling operation employing the modified drilling fluids described above.

BACKGROUND OF THE INVENTION

In a drilling operation, such as in a rotary drilling operation, a drilling fluid is forced down the drill string, about the drill bit at the bottom of the borehole and then back up to the surface. The drilling fluid employed in such a drilling operation usually is an aqueous drilling fluid and is compounded of various materials in order to impart certain desirable physical and chemical properties to the drilling fluid. For example, there is usually incorporated in an aqueous drilling fluid a hydratable clayey material, such as a bentonite clay, to impart desirable viscosity and gel strength properties to the drilling fluid so as to better enable the drilling fluid to carry away the drilling cuttings from the bottom of the borehole. Other materials such as weighting agents, e.g., barium sulfate, are employed to increase the density of the drilling fluid so as to make the drilling operation more effective and safer by overcoming the fluid pressure within the formation being drilled. Other materials such as water loss improving agents, e.g., carboxymethylcellulose, hydrolyzed starch, etc. are added to reduce the loss of fluid from the drilling fluid into the formation during the drilling operation. Still other materials such as corrosion inhibitors, bactericides and drill bit lubricants are incorporated in the drilling fluid in order to improve the drilling operation and the drilling fluid.

Although a wide variety of aqueous drilling fluids containing materials designed to increase the lubricity of these fluids have been proposed and used in the field such as: vegetable oils including soybean and rice oil; tall oil; sodium salts of petroleum sulfonic acids and resin acids (see U.S. Pat. No. 4,064,056); polyethoxylated tetralkylacetylenic diols; and, an ester of thio-bis alkanols and alkenyl succinic acid or anhydride (see U.S. patent application Ser. No. 277,053 filed June 24, 1981 of common assignee), it remains essential that lubricity of said drilling fluids be further improved to reduce the energy requirement of said drilling and abrasion of the drilling equipments.

It is therefore an object to provide an additive composition for drilling fluids that reduces its drilling torque.

SUMMARY OF THE INVENTION

It has been discovered that the addition of a minor amount of an oxazoline of an alkylthioglycolic acid formed by the reaction of (a) alkylthioglycolic acids of the formula:

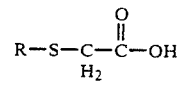

wherein R represents an alkyl group of from 1 to 30, preferably 6 to 20 carbons; with (b) an equimolar amount of a 2,2-disubstituted-2-amino-1-alkanol containing a total of 4 to 8 carbon atoms to an aqueous drilling fluid substantially increases the lubricity of said drilling fluid as measured, for example, by torque reduction.

Useful are aqueous drilling fluids containing from 0.1 to 10, preferably 0.5 to 5, optimally 1 to 3, pounds per barrel of drilling fluid of the oxazoline of an alkylthioglycolic acid.

DETAILED DESCRIPTION OF THE INVENTION

As used herein, the term "oxazoline" refers to products made from equimolar proportions of said alkyl thioglycolic acid and said amino alkanol having from 4 to 8 carbon atoms.

The alkylthioglycolic acid having the general formula:

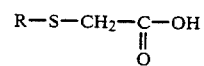

wherein R represents an alkyl group of 1 to 30 carbons is illustrated by

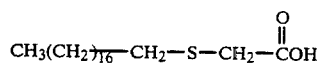

The amino alcohol used to react with the thioglycolic acid to provide the oxazoline ring is a 2,2-disubstituted-2-amino-1-alkanol containing a total of 4 to 8 carbon atoms, and which can be represented by the formula

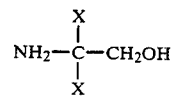

wherein X is an alkyl group, or hydroxy alkyl group of the structure: $-(CH_2)_nOH$, wherein n is 1 to 3.

Examples of such 2,2-disubstituted amino alkanols, include 2-amino-2-methyl-1-propanol (hereinafter AMP), 2-amino-2-methyl-1,3-propanediol (hereinafter AMPD), 2-amino-2-(hydroxymethyl)-1,3-propanediol (also known as trishydroxyaminomethane or THAM), 1-amino-2-ethyl-1,3-propanediol (hereinafter AEPD), etc. Because of its effectiveness, availability and cost, the THAM is particularly preferred.

THE OXAZOLINE REACTION CONDITIONS

The formation of the novel oxazoline materials in a very high yield, can be effected by adding at least about 1 molar equivalent of the aforesaid 2,2-disubstituted-2-amino-1-alkanol per mole equivalent of the alkyl thioglycolic acid, ester or amide with or without an inert diluent, and heating the mixture at 100°–240° C., preferably 170°–220° C. until reaction is complete by infrared analysis of the product showing maximal absorption for oxazoline.

Although not necessary, the presence of small amounts such as 0.01 to 2 wt.%, preferably 0.1 to 1 wt.%, based on the weight of the reactants, of a metal salt can be used in the reaction mixture as a catalyst. The metal catalyst can later be removed by filtration or by washing a hydrocarbon solution of the product with a lower alcohol, such as methanol, ethanol, isopropanol, etc., or an alcohol/water solution.

Alternatively, the metal salt can be left in the reaction mixture, as it appears to become stably dispersed, or dissolved, in the reaction product.

Inert solvents which may be used in the above reaction include hydrocarbon oils, e.g. mineral lubricating oil, kerosene, neutral mineral oils, xylene, halogenated hydrocarbons, e.g., carbon tetrachloride, dichlorobenzene, tetrahydrofuran, etc.

Metal salts that may be used as catalysts in the invention include carboxylic acid salts of Zn, Mn and Fe. Metal catalysts derived from strong acids (HCl, sulfonic acid, $H_2SO_4$, $HNO_3$, etc.) and bases, tend to diminish the yield of the oxazoline products and instead favor amide or ester formation. For this reason, these strong acid catalysts or basic catalysts are not preferred and usually will be avoided. The carboxylic acids used to prepare the desired catalysts, include $C_1$ to $C_{18}$, e.g. $C_1$ to $C_8$ acids, such as the saturated or unsaturated mono- and dicarboxylic aliphatic hydrocarbon acids, particularly fatty acids. Specific examples of such desired carboxylic acid salts include zinc acetate, zinc formate, zinc propionate, zinc stearate, maganese(ous) acetate, iron tartrate, cobalt(ous) acetate, etc. Completion of the oxazoline reaction can be readily ascertained by using periodic infrared spectral analysis for following oxazoline formation (C=N absorption band at 6.0 microns) until maximized, or by the cessation of water evolution.

REACTION MECHANISMS OF THE OXAZOLINE FORMATION

While not known with complete certainty, but based on experimental evidence, it is believed that the reaction of the alkyl thioglycolic acid material, e.g., a substituted thioglycolic acid, ester or amide with the amino alcohol of the invention, e.g. 1 to 1.5 molar equivalents of 2,2-disubstituted-2-aminoethanol such as trishydroxymethylamino methane (THAM), gives oxazoline ring structures as portrayed hereafter:

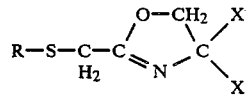

wherein R represents an alkyl radical containing from 1 to 30 carbons and X is selected from the group consisting of an alkyl group or hydroxyl alkyl group of the structure $-(CH_2)_nOH$, where n is 1 to 3.

The amount of the alkylthioglycolic oxazoline added to the well drilling fluid may be only a minor but sufficient amount to substantially increase the lubricity of the said drilling fluid as measured, for example, by torque reduction. The amount to be added to the well drilling fluid is in the range of from 0.1 to 10, preferably 0.5 to about 5, pounds per barrel of drilling fluid, optimally from about 1 to about 3 pounds per barrel.

It has been found that the drilling fluids of the present invention exhibit a high degree of lubricity and little or no abnormal distortion of mud properties.

The additives are generally introduced into the drilling mud as a hydrocarbon solution containing broadly from at least 2 to 99, preferably 30 to 70, optimally 40 to 50, weight % additive based on the total weight of the solution. The additive can also be introduced neat, i.e., only additive, in the drilling mud when significantly dispersible into the aqueous mud. If desired, other additives such as water loss improving agents, corrosion inhibitors, bactericides, etc. can be introduced as part of the additive—solvent package into the drilling mud.

Suitable hydrocarbon solvents include: mineral oils, particularly those paraffin base oils of good oxidation stability with a boiling range of from 200° C. to 400° C. such as Mentor 28 sold by Exxon Chemical Americas, Houston, Tex.; diesel and gas oils; and heavy aromatic naphtha. Preferred are those above-referenced paraffin base oils.

The invention is further illustrated by the following Examples which are not to be considered as limitative of its scope.

EXAMPLE 1
2-(OCTADECYLTHIOMETHYL)-5,5-DIMETHYL-2-OXAZOLINE

An oxazoline of octadecylthioglycolic acid and 2-amino-2-methyl-1-propanol (hereinafter AMP) was prepared as follows:

A mixture of 68.8 g (0.2 mole) of octadecylthioglycolic acid (prepared by the free radical addition of thioglycolic acid to 1-octadecene), 200 ml of xylene and 17.8 g (0.2 mole) of AMP was charged into a laboratory glass 1 liter reaction flask, equipped with a thermometer, nitrogen atmosphere and an overhead condenser with a Dean-Stark water trap. The mixture in the flask was heated to about 140°-145° C. to azeotrope the water of reaction. Heating was continued until complete cessation of water and maximum infrared absorption band for an oxazoline ring at about 6.0 microns. The solvent was evaporated and a white solid was collected. The infrared spectrum of the solid showed to correspond to the desired structure

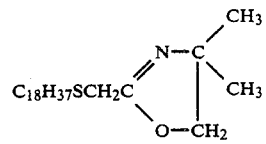

EXAMPLE 2
2-(OCTADECYLTHIOMETHYL)-5-ETHYL-5-METHYLOL-2-2OXAZOLINE

An oxazoline of octadecylthioglycolic acid and 2-amino-2-ethyl-1,3-propanediol (AEPD) was prepared as follows:

A mixture of 141 g (0.41 mole) of octadecylthioglycolic acid, prepared via the free radical addition of thioglycolic acid to 1-octadecene, 48.8 g (0.41) of 2-amino-2-ethyl-1,3-propanediol and 200 ml of xylene was charged into a 1 liter round bottomed four neck flask equipped with thermometer, nitrogen atmosphere, condenser and a Dean-Starke water trap. The reaction flask was heated to 140°-150° C. to azeotrope the water of reaction for several hours until complete cessation of water and maximum infrared absorption for the oxazoline functionality. The solvent was evaporated under vacuum using a rotoevaporator at 100° C. until constant weight. The residue gave an infrared spectrum consistent with the desired oxazoline product and analyzed for 71.63% C, 11.59% H, 3.31% N and 6.99% S. It requires 70.25% C, 11.48% H, 3.28% N and 7.49% S. The structure is assumed to be

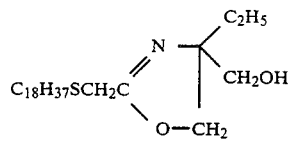

EXAMPLES 3-12

Numerous oxazolines were prepared in accordance with the procedure of Examples 1 and 2 by equimolar reactions of the designated alkylthioglycolic acid and the designated 2-amino-1-alkanol as seen from the following Table I. In Table I the reactants are noted as is the final product, 2-(alkylthiomethyl)-5,5-disubstituted-2-oxazoline, by a proposed structure and by physical properties.

TABLE I

Product of Formula $$\text{alkyl}\diagdown S-CH_2-C\diagup\!\!\!\!\diagup\overset{N-C}{\underset{O-CH_2}{\diagdown}}\!\!\overset{CH_2-X_1}{\underset{CH_2-X_2}{\diagup}}$$

wherein X is as indicated and alkyl

| Example | Alkyl Thioglycolic Acid Where Alkyl Group is | Amino-1-Alkanol | $X_1$ | $X_2$ | Properties |
|---|---|---|---|---|---|
| 3 | $C_8H_{17}-$ | AMP | H | H | dark brown liquid |
| 4 | $C_8H_{17}-$ | AMPD | H | OH | amber liquid |
| 5 | $C_8H_{17}-$ | AEPD | OH | $CH_3$ | brown liquid |
| 6 | $C_8H_{17}-$ | THAM | OH | OH | gold wax |
| 7 | $C_{18}H_{37}-$ | AMPD | H | OH | white solid |
| 8 | $C_{18}H_{37}-$ | THAM | OH | OH | white solid |
| 9 | $C_{20}H_{41}-$ | AMP | H | H | heavy brown oil |
| 10 | $C_{20}H_{41}-$ | AMPD | H | OH | wax solid |
| 11 | $C_{20}H_{41}-$ | AEPD | OH | $CH_3$ | heavy brown oil |
| 12 | $C_{20}H_{41}-$ | THAM | OH | OH | white waxy solid |

EXAMPLES 13-16

The lubricity activity of the formulations of the invention are shown in Table II followed by comparison with a base mud. The base mud is prepared from 20 to 25 pounds of bentonite [5 to 7 wt. %], 4 to 6 pounds of lignosulfonate [1 to 2 wt. %] and sufficient sodium hydroxide to adjust the pH to 9.5 to 10.5 per barrel of water. This is the basic drilling mud to which the lubricity additives taught here are added to produce the drilling muds of much enhanced lubricity as seen from the following Table II.

The rheology data of Table II was determined on a Fann model 35 Viscosimeter purchased from Fann Industries of Houston, Tex. The torque data was determined on a Baroid Lubricity Tester available from the Baroid Division of N. L. Industries, Houston, Tex.

Although the utility of the compounds of the invention has been directed to lubricity enhancement of drilling muds, each has utility requiring activity at a metal surface. The property of surface activity of these compounds and the thermal decomposition byproducts toward metal surfaces as film formers favors the use of each, alone or in combination in amounts ranging from 10 to 100 parts per million as a film former in a corrosion inhibitor formula for heat exchanger fluids in refinery equipment, in metal rolling mills as an anti spotting additive and in metal cutting fluids because of surface passivation and/or oxygen pacification.

The compounds of the invention are particularly useful as oxidation inhibitors to protect fluids such as refinery feed stream subjected to high temperatures in heat exchangers. It is believed that the combination in one molecule of sulfur (provides oxidation inhibition) and the hydroxy oxazoline (provides surface activity) has special value in applications where oxidative degradation is a problem. In these applications, the compounds of the invention bring the oxidative inhibition of the sulfur to the region of maximum oxidative degradation which occurs adjacent to the metal surface.

POST TREATMENT OF COMPOUNDS OF INVENTION

Treatment of the reaction product of 2-(octadecylthio) glycolic acid and tris-hydroxymethyl amino methane (THAM), for example, with tributyl phosphite affords an oxazoline phosphite ester derivative containing 0.1 to 1 wt% phosphorous with antioxidant properties.

Similarly, the boration (using boric acid or ester) of oxazoline from the reaction of 2-(octadecylthio) glycolic acid and THAM gives borate esters containing from 0.1 to 1 weight percent of boron which feature anticorrosion activity in refinery feedstreams.

Finally, the oxyalkylation of the oxazolines of the present invention with alkylene oxides provides novel derivatives adaptable to a variety of surfactant application, which require oxidation and corrosion control in oil field chemical applications.

The invention in its broader aspect is not limited to the specific details shown and described and departures may be made from such details without departing from the principles of the invention and without sacrificing its chief advantages.

TABLE II

| Example | Additive | Additive Conc.[1] Lb/BB1 | Plastic Viscosity | Yield Point | Gel[2] | % Torque[3] Reduction |
|---|---|---|---|---|---|---|
| 13 | None | | 28 | 7 | 2–4 | — |
| 14 | Product Ex. 2 | 1 | 40 | 18 | 3–5 | 38.4 |
| 15 | Product Ex. 1 | 2 | 49 | 8 | 3–4 | 28.8 |
| 16 | Product Ex. 8 | 2 | 53 | 34 | 3–3 | 21.8 |

[1]All additives added as a 50% concentrate in parafinic hydrocarbon
[2]Deflection on Viscosimeter at 3 rpm initially and after 10 minutes
[3]As measured by Baroid Lubricity Tester

What is claimed is:

1. An alkaline drilling mud comprising particles of clayey material suspended in sufficient water to render it circulatable and from 0.1 to 10 pounds of an alkyl thiomethyl oxazoline per barrel of drilling mud, said oxazoline being represented by the formula

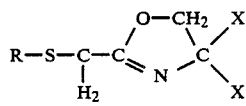

wherein R represents an alkyl radical containing from 1 to 30 carbons and X is selected from the group consisting of an alkyl group or hydroxy alkyl group of the structure $-(CH_2)_nOH$ where n is 1 to 3.

2. A mud according to claim 1 wherein said oxazoline is an alkylthiomethyl oxazoline wherein the alkyl radical contains from 6 to 20 carbons.

3. An alkaline drilling mud according to claim 1 wherein said oxazoline is the product provided by the reaction of (a) alkylthioglycolic acid of the formula:

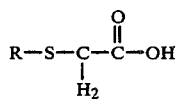

wherein R represents an alkyl radical of from 1 to 30 carbons with (b) from 1 to 1.5 molar equivalents of a 2,2-disubstituted-2-amino-1-alkanol containing a total of 4 to 8 carbon atoms.

4. In the process for drilling a well with well drilling tools wherein there is circulated in the well an alkaline drilling mud containing particles of clayey material suspended in sufficient liquid to render the same circulatable, the method of reducing the drilling torque of the drilling mud comprising adding to each barrel of said mud from 0.1 to 10 pounds of an oxazoline of an alkylthioglycolic acid, said oxazoline being represented by the formula

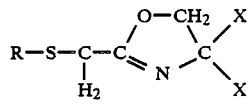

wherein R represents an alkyl radical containing from 1 to 30 carbons and X is selected from the group consisting of an alkyl group or hydroxy alkyl group of the structure $-(CH_2)_nOH$ where n is 1 to 3.

5. The process according to claim 4 wherein said oxazoline is 2-(octadecylthiomethyl)-5,5-dimethyl-2-oxazoline.

6. The process according to claim 4 wherein said oxazoline is 2-(octadecylthiomethyl)-5-ethyl-5-methylol-2-oxazoline.

7. An additive combination for increasing the lubricity of drilling muds consisting essentially of from 30 to 70 parts by weight of an oxazoline of an alkylthioglycolic acid dissolved in hydrocarbon oil whereby the drilling torque of said mud is reduced, said oxazoline being represented by the formula

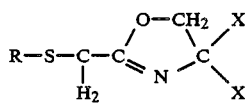

wherein R represents an alkyl radical containing from 1 to 30 carbons and X is selected from the group consisting of an alkyl group or hydroxy alkyl group of the structure $-(CH_2)_nOH$ where n is 1 to 3.

8. An additive combination according to claim 7 wherein said oxazoline is 2-(octadecylthiomethyl)-5,5-dimethyl-2-oxazoline.

9. An additive combination according to claim 7 wherein said oxazoline is 2-(octadecylthiomethyl)-5-ethyl-5-methylol-2-oxazoline.

* * * * *